(12) United States Patent
Toita

(10) Patent No.: US 7,749,086 B2
(45) Date of Patent: Jul. 6, 2010

(54) PROPELLER SHAFT

(75) Inventor: Shinya Toita, Tochigi (JP)

(73) Assignee: Showa Corporation, Gyoda-Shi (JP)

( * ) Notice: Subject to any disclaimer, the term of this patent is extended or adjusted under 35 U.S.C. 154(b) by 220 days.

(21) Appl. No.: 11/849,314

(22) Filed: Sep. 3, 2007

(65) Prior Publication Data

US 2008/0182672 A1 Jul. 31, 2008

(30) Foreign Application Priority Data

Jan. 30, 2007 (JP) ............................. 2007-019968

(51) Int. Cl.
*F16C 3/02* (2006.01)
(52) U.S. Cl. ..................................... 464/180
(58) Field of Classification Search ................ 464/127, 464/180; 180/381; 188/378–380
See application file for complete search history.

(56) References Cited

U.S. PATENT DOCUMENTS 2,751,765 A * 6/1956 Rowland et al. ............ 464/180
7,549,927 B2 * 6/2009 Haile et al. ................. 464/180
2005/0215331 A1 * 9/2005 Campbell
2009/0062023 A1 * 3/2009 Habara ....................... 464/180

FOREIGN PATENT DOCUMENTS

| JP | 2001-12446 | 1/2001 |
| JP | 3544579 | 7/2004 |
| JP | 3753191 | 3/2006 |

* cited by examiner

*Primary Examiner*—Greg Binda
(74) *Attorney, Agent, or Firm*—Babcock, IP, PLLC

(57) ABSTRACT

In a state in which a dynamic damper and paper dampers are installed to an inner portion of a first propeller shaft, there is provided a structure in which inclined end portions in an inner side in a diametrical direction of the paper dampers opposing to an inner weight of the dynamic damper are positioned in such a manner as to be largely away from the inner weight. Accordingly, since an offset space can be formed between the inclined end portions of two paper dampers and an end portion in an axial direction of the inner weight of the dynamic damper, it is possible to avoid a contact between both the elements.

6 Claims, 3 Drawing Sheets

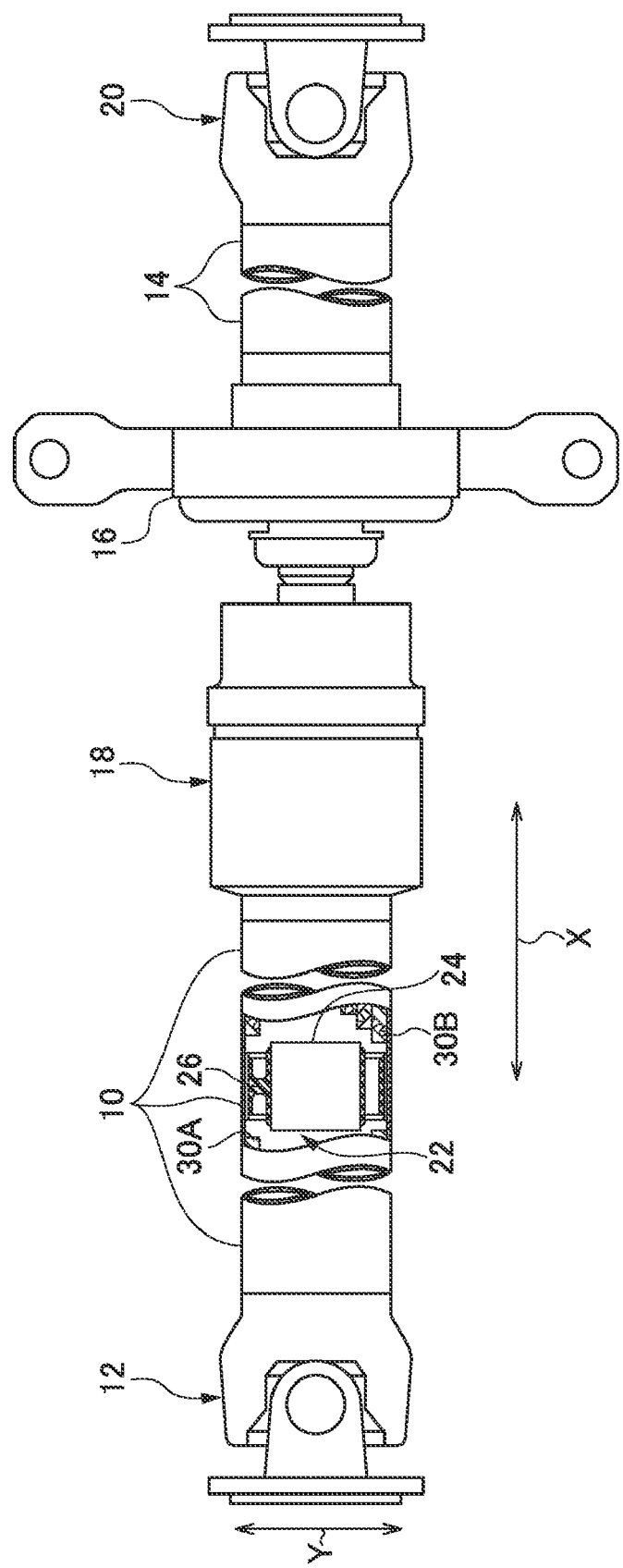

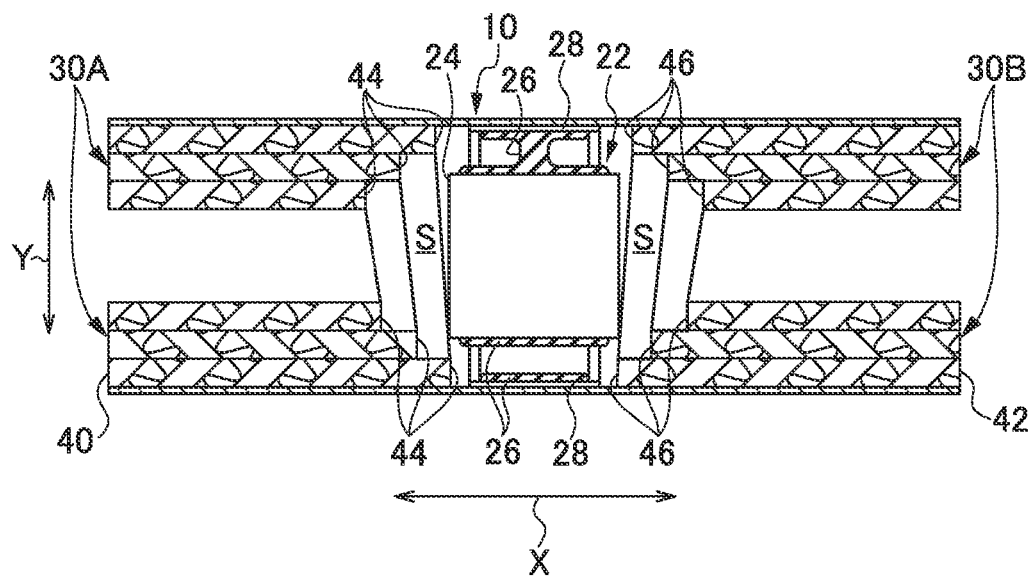
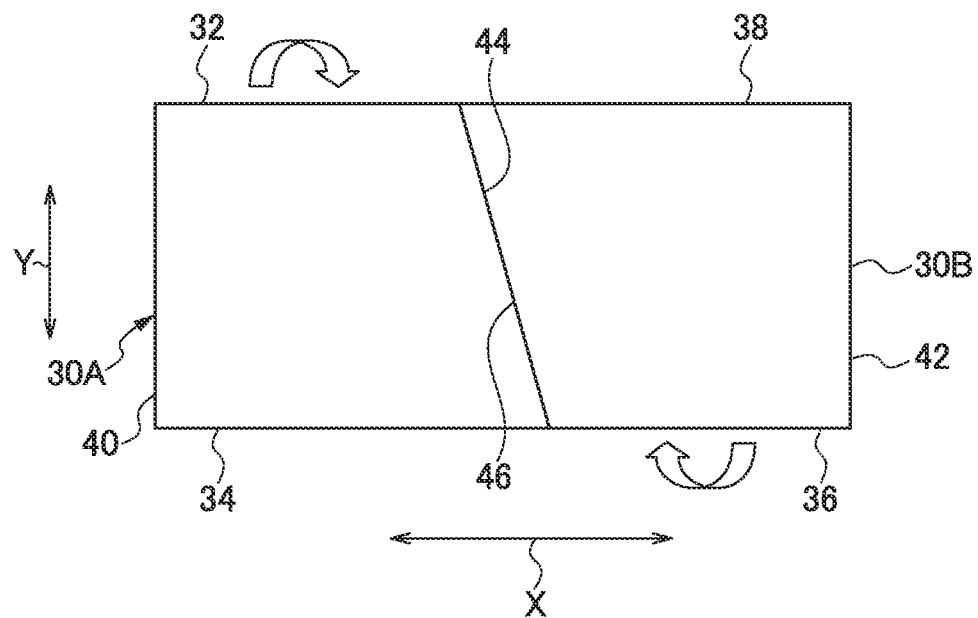

PROPELLER SHAFT

BACKGROUND OF THE INVENTION

1. Field of the Invention

The present invention relates to a propeller shaft used in a vehicle such as a motor vehicle or the like, and more particularly to a propeller shaft provided with a dynamic damper and a paper damper in an inner portion.

2. Description of the Related Art

As shown in FIG. 4, there has been conventionally known a propeller shaft 100 structured such that a dynamic damper 102 and a paper damper 104 are provided in an inner portion (for example as disclosed in Japanese Patent Application Laid-open No. 2001-12446). In other words, an output of an internal combustion engine mounted to a front portion of a vehicle is generally transmitted to a drive wheel in a rear side by the propeller shaft 100 via a transmission, however, since a characteristic of the propeller shaft 100 exerts a great influence on a vibration of the vehicle, it is possible to improve a vibration characteristic of the propeller shaft 100 by installing the dynamic damper 102 to a cylinder inner portion of the propeller shaft 100 and attenuating a vibration by the dynamic damper 102.

Further, a fuzzy sound is generated at a time of a rotation of the propeller shaft 100, however, it is possible to reduce or vanish the fuzzy sound by setting the paper damper 104 in the inner portion of the propeller shaft 100. In this case, as shown in FIG. 5, the paper damper 104 is formed as an approximately rectangular shape in a plan view in a state of being expanded, and is inserted to the inner portion of the propeller shaft 100 in a state of being wound in a tubular shape (for example as disclosed in Japanese Patent No. 3544579).

(Patent Document 1) Japanese Patent Application Laid-open No. 2001-12446
(Patent Document 2) Japanese Patent No. 3544579
(Patent Document 3) Japanese Patent No. 3753191

However, in the structure in which the dynamic damper and the paper damper are provided in the inner portion of the propeller shaft, a part (a weight portion or the like) of the dynamic damper may come into contact with the paper damper at a time of simultaneously inserting the dynamic damper and the paper damper to the inner portion of the propeller shaft. If a part (the weight portion or the like) of the dynamic damper comes into contact with the paper damper, the function of the dynamic damper is compromised.

SUMMARY OF THE INVENTION

Accordingly, the present invention provides a propeller shaft preventing the problem that the original function of the dynamic damper can not be achieved due to the contact between the dynamic damper and the paper damper, even in the case that the dynamic damper and the paper damper are provided side by side in the inner portion of the propeller shaft.

The present invention relates to a propeller shaft in which a dynamic damper and a paper damper are provided along an axial direction. The paper damper is provided with a contact avoiding means avoiding a contact with the dynamic damper.

Furthermore, the present invention relates to a propeller shaft in which a dynamic damper and a paper damper are provided in an axial direction. An end portion positioned in the dynamic damper side of the paper damper is constituted by an inclined end portion inclined in a plan view in a state in which the paper damper is expanded. A contact avoiding portion avoiding a contact with the dynamic damper in the inclined end portion is formed by winding the paper damper cylindrically.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIG. 1 is a partial side elevational view showing a propeller shaft in accordance with an embodiment of the present invention in a partly omitted manner;

FIG. 2 is a cross sectional view obtained by cutting a main portion of the propeller shaft in accordance with the embodiment of the present invention along an axial direction;

FIG. 3 is a plan view showing a state in which a paper damper installed to the propeller shaft in accordance with the embodiment of the present invention is expanded;

DESCRIPTION OF THE PREFERRED EMBODIMENTS

Figure 4:
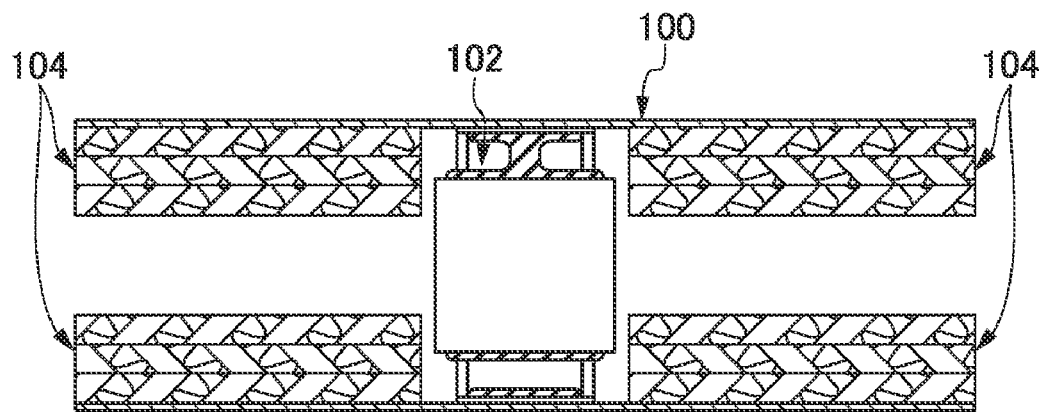
FIG. 4 is a cross sectional view obtained by cutting a main portion of a conventional propeller shaft along an axial direction.
Figure 5:
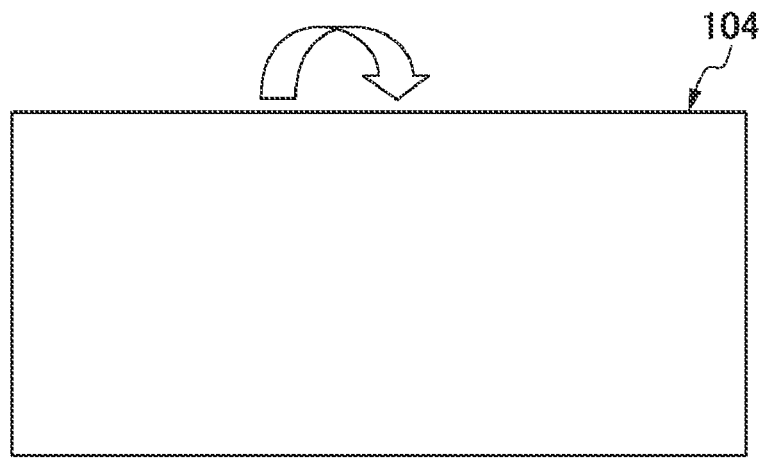
FIG. 5 is a plan view showing a state in which a paper damper installed to the conventional propeller shaft is expanded.

Next, a description will be given of a propeller shaft in accordance with an embodiment of the present invention with reference to the accompanying drawings. FIG. 1 shows a part of a power transmission mechanism of a vehicle, and shows a state in which a first propeller shaft and a second propeller shaft are coupled in a partly omitted manner.

As shown in FIG. 1, a front end of a first propeller shaft 10 is coupled to an output side of an internal combustion engine via a cross joint 12. A second propeller shaft 14 is structured such that a front portion rotatably supported to a ring-shaped bearing support 16 is coupled to the first propeller shaft 10 by a tripod type constant velocity universal joint 18. Further, a rear end of the second propeller shaft 14 is coupled to a power transmission member in the next stage via a cross joint 20.

As shown in FIGS. 1 and 2, a dynamic damper 22 is installed to an inner portion of the first propeller shaft 10. The dynamic damper 22 is constituted by a cylindrical outer ring member 28 (not shown in FIG. 1), a columnar inner weight 24 positioned in an inner side of the outer ring member 28 in a diametrical direction, and a rubber member 26 coupling both the elements. The dynamic damper 22 is installed to a predetermined position of the first propeller shaft 10 by being pressure inserted to the inner portion of the first propeller shaft 10. In this case, since a structure of the dynamic damper 22 is disclosed in detail in the patent document 3 mentioned above, a description thereof will be omitted.

Further, as shown in FIG. 2, paper dampers 30A and 30B are installed to positions in both sides in an axial direction (a direction of an arrow X in FIG. 2) with respect to the dynamic damper 22 in the inner portion of the first propeller shaft 10. As shown in FIG. 3, the paper dampers 30A and 30B are formed in such a manner that an end portion positioned in one side in an axial direction (a direction of an arrow X in FIG. 3) of the propeller shaft in a plan view in an expanded state forms inclined end portions (taper end portions) 44 and 46 which are inclined with respect to a diametrical direction (a direction of an arrow Y in FIG. 3) of the propeller shaft. Accordingly, as shown in FIG. 3, the paper dampers 30A and 30B are formed in a trapezoidal shape in a plan view in an expanded state. In this case, the paper dampers 30A and 30B are structured by a cardboard such as a center core paper of a corrugated board or the like.

As shown in FIG. 3, the paper dampers 30A and 30B installed to the inner portion of the first propeller shaft 10 can be easily manufactured, for example, preparing a material which is formed in a rectangular shape in a plan view in an expanded state, and cutting this in a direction of inclination shown in FIG. 3.

Further, the paper dampers 30A and 30B are inserted to the inner portion of the first propeller shaft 10 in a state of being wound cylindrically. In this case, the paper dampers 30A and 30B are wound from an extension end portion 32 towards an opposite end portion 34 and similarly from an extension end portion 36 towards a corresponding opposite end portion 38 extending along the axial direction of the first propeller shaft 10. In other words, the paper dampers 30A and 30B are wound in such a manner that the extension end portions 32 and 36 in a side that a dimension (a shortest distance) from corresponding opposite side end portions 40 and 42 to inclined end portions 44 and 46 is short is positioned in an inner side of the paper dampers 30A and 30B in a diametrical direction, along the axial direction of the first propeller shaft 10, on either side of the dynamic damper 22.

In the present embodiment, the paper damper 30A corresponding to one of two divided paper dampers is wound in such a manner that the one extension end portion 32 side which has a width that is shorter than opposite extension end portion 34 extending along the axial direction of the first propeller shaft 10 is positioned in the inner side of the paper dampers 30A in the diametrical direction. Further, the paper damper 30B corresponding to the other of two divided paper dampers is wound in such a manner that the other extension end portion 36 side which has a width that is shorter than opposite end portion 38 extending along the axial direction of the first propeller shaft 10 is positioned in the inner side of the paper dampers 30B in the diametrical direction.

As shown in FIG. 2, two paper dampers 30A and 30B are wound as mentioned above so as to formed in a cylindrical shape, and are inserted to the first propeller shaft 10 in such a manner that each of the inclined end portions 44 and 46 is positioned in the dynamic damper 22 side, and the dynamic damper 22 is sandwiched from both sides. At this time, in a state in which the paper dampers 30A and 30B are wound, the inner sides of the paper dampers 30A and 30B in the diametrical direction comes to a state of being offset to an opposite side to the dynamic damper 22. Accordingly, in a state in which the dynamic damper 22 and the paper dampers 30A and 30B are installed to the inner portion of the first propeller shaft 10, there is formed such a structure that the inclined end portions 44 and 46 in the inner side in the diametrical direction of the paper dampers 30A and 30B opposing to the inner weight 24 of the dynamic damper 22 are largely away from the inner weight 24. In other words, two paper dampers 30A and 30B are installed in a state of avoiding a contact with the inner weight 24 of the dynamic damper 22.

Next, a description will be given of an operation of the propeller shaft in accordance with the present embodiment.

As shown in FIGS. 1 and 2, in the state in which the dynamic damper 22 and the paper dampers 30A and 30B are installed to the inner portion of the first propeller shaft 10, there is provided a structure in which the inclined end portions 44 and 46 in the inner side in the diametrical direction of the paper dampers 30A and 30B opposing to the inner weight 24 of the dynamic damper 22 are positioned in such a manner as to be largely away from the inner weight 24. Accordingly, since an offset space S (a contact avoiding portion) is formed between the inclined end portions 44 and 46 of two paper dampers 30A and 30B and the end portion in the axial direction side of the inner weight 24 of the dynamic damper 22, it is possible to avoid the contact between both the elements. As a result, it is possible to prevent the inner weight 24 of the dynamic damper 22 from coming into contact with the paper dampers 30A and 30B, whereby the original function of the dynamic damper 22 can not be achieved.

Particularly, as shown in FIG. 2, the inner weight 24 protruding to the paper dampers 30A and 30B side is provided in the inner side of the dynamic damper 22 in the diametrical direction, however, it is possible to securely avoid the contact between the paper dampers 30A and 30B and the inner weight 24 by winding the paper dampers 30A and 30B in such a manner that the portions in the inner side of the paper dampers 30A and 30B in the diametrical direction become offset from the side end portion in the axial direction of the inner weight 24 of the dynamic damper 22.

As mentioned above, in accordance with the present invention, the dynamic damper 22 and the paper damper 30A, 30B are provided along the axial direction, in the inner portion of the propeller shaft 10. In this case, since the contact avoiding means avoiding the contact with the dynamic damper 22 is provided in the paper damper, it is possible to prevent the paper damper 30A, 30B and the dynamic damper 22 from coming into contact with each other. Accordingly, it is possible to prevent the dynamic damper 22 from coming into contact with the paper damper 30A, 30B whereby the original function of the dynamic damper 22 can not be achieved.

Further, in accordance with the present invention, the end portion positioned in the dynamic damper 22 side of the paper damper 30A, 30B corresponds to the inclined end portion which is inclined in the plan view in the state in which the paper damper 30A, 30B is expanded. Further, the contact avoiding portion avoiding the contact with the dynamic damper 22 in the inclined end portion is formed by winding the paper damper 30A, 30B cylindrically. Accordingly, it is possible to prevent the paper damper 30A, 30B and the dynamic damper 22 from coming into contact with each other. As a result, it is possible to prevent the dynamic damper 22 from coming into contact with the paper damper, whereby the original function of the dynamic damper 22 can not be achieved.

Further, in accordance with the present invention, the paper damper 30A, 30B has two extension end portions 32 and 36 extending along the axial direction of the propeller shaft 10 in the plan view in the state in which the paper damper 30A, 30B is expanded, and the paper damper 30A, 30B is wound in such a manner that each of the two extension end portions 32 and 36, are positioned in the inner side in the diametrical direction providing an orientation of the inclined end portions by which the respective inner side in the diametrical direction of each paper damper 30A and 30B proximate the dynamic damper 22 has a shorter width than the outer side in the diametrical direction. Accordingly, it is possible to form the contact avoiding portion in the inner side of the paper damper 30A, 30B in the diametrical direction and it is possible to securely avoid the contact between the weight portion and the paper damper 30A, 30B, for example, even in the structure in which the weight portion positioned in the inner side of the dynamic damper 22 in the diametrical direction protrudes in the axial direction.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A propeller shaft in which a dynamic damper and a paper damper are provided in an axial direction,
    wherein an end portion of the paper damper positioned in the dynamic damper side of the paper damper is constituted by an inclined end portion inclined in a plan view in a state in which the paper damper is expanded, and
    wherein a contact avoiding portion of the paper damper avoiding a contact with the dynamic damper in the inclined end portion is formed by winding the paper damper cylindrically.

2. A propeller shaft as claimed in claim 1, wherein the paper damper has two extension end portions extending along the axial direction of the propeller shaft in a plan view in a state in which the paper damper is expanded, and
    wherein the paper damper is wound in such a manner that the inclined end portion is positioned in an inner side in a diametrical direction.

3. A propeller shaft as claimed in claim 2, wherein the dynamic damper is constituted by a cylindrical outer ring member, a columnar inner weight positioned in an inner side in a diametrical direction of the outer ring member, and a rubber member coupling the outer ring member and the inner weight,
    wherein the paper damper is structured by winding a center core paper of a corrugated board.

4. A propeller shaft as claimed in claim 1, wherein the dynamic damper is constituted by a cylindrical outer ring member, a columnar inner weight positioned in an inner side in a diametrical direction of the outer ring member, and a rubber member coupling the outer ring member and the inner weight,
    wherein the paper damper is structured by winding a center core paper of a corrugated board.

5. A propeller shaft, comprising:
    a shaft having a dynamic damper and a paper damper disposed in an axial direction within an inner portion of the shaft;
    the paper damper having an end portion and an opposite end portion is wound cylindrically;
    the end portion at an inner side having a smaller width in the axial direction than the opposite end portion.

6. The propeller shaft of claim 5, wherein an offset space between the paper damper and the dynamic damper is largest in the axial direction at the inner side;
    the offset space preventing contact between an inner weight of the dynamic damper and the paper damper.

* * * * *